United States Patent
Teufel et al.

(10) Patent No.: US 12,258,161 B2
(45) Date of Patent: Mar. 25, 2025

(54) FILLING FLOW DIVIDER

(71) Applicant: Albert Handtmann Maschinenfabrik GmbH & Co. KG, Biberach (DE)

(72) Inventors: Daniel Teufel, Schemmerhofen (DE); Steffen Meinel, Biberach (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 137 days.

(21) Appl. No.: 18/172,166

(22) Filed: Feb. 21, 2023

(65) Prior Publication Data
US 2023/0271736 A1    Aug. 31, 2023

(30) Foreign Application Priority Data
Feb. 28, 2022   (EP) ..................... 22159170

(51) Int. Cl.
| | | |
|---|---|---|
| *B65B 37/10* | (2006.01) | |
| *B65B 25/00* | (2006.01) | |
| *B65B 57/14* | (2006.01) | |
| *B65B 65/00* | (2006.01) | |

(52) U.S. Cl.
CPC ............ *B65B 37/10* (2013.01); *B65B 25/001* (2013.01); *B65B 57/145* (2013.01); *B65B 65/003* (2013.01)

(58) Field of Classification Search
CPC ......... B65B 37/06; B65B 37/08; B65B 37/10; B65B 37/20; B65B 57/145
USPC .......................... 141/140, 236, 238, 243, 244
See application file for complete search history.

(56) References Cited

U.S. PATENT DOCUMENTS

| | | | |
|---|---|---|---|
| 3,193,156 A | 7/1965 | Egee et al. | |
| 3,762,305 A | 10/1973 | Glackin | |
| 5,522,439 A * | 6/1996 | Hakansson | B65B 3/30 |
| | | | 141/237 |
| 5,769,136 A * | 6/1998 | Kanematsu | B65B 3/32 |
| | | | 141/156 |
| 6,837,282 B2 * | 1/2005 | Navarro | B65B 3/12 |
| | | | 141/181 |

(Continued)

FOREIGN PATENT DOCUMENTS

| | | |
|---|---|---|
| AU | 6093973 A | 4/1975 |
| CA | 2683659 A1 | 5/2010 |

(Continued)

OTHER PUBLICATIONS

Japanese Patent Office, Office Action Issued in Application No. 2023-024201, Jan. 9, 2024, 6 pages.

*Primary Examiner* — Timothy L Maust
(74) *Attorney, Agent, or Firm* — McCoy Russell LLP (57) ABSTRACT

The invention relates to a filling flow divider for food products and to a method for discharging food products and a filling machine, wherein the filling flow divider has an inlet via which an inflowing mass flow can be divided into a plurality of partial mass flows, transported further in a plurality of partial lines and discharged portion-wise onto or into an object via their outlet, and a plurality of commonly driven dosing devices for adjusting the volume flow of the respective partial mass flows. In this context, a valve device is arranged in each of the respective partial lines, which can divert the partial mass flow such that no mass is discharged via the outlet of the respective partial line.

15 Claims, 5 Drawing Sheets

(56) References Cited

U.S. PATENT DOCUMENTS

| | | | | |
|---|---|---|---|---|
| 7,108,024 | B2 * | 9/2006 | Navarro | F04B 5/02 |
| | | | | 141/237 |
| 9,862,585 | B2 * | 1/2018 | Ramnarain | B65B 43/52 |
| 2020/0346241 | A1 | 11/2020 | Teufel et al. | |

FOREIGN PATENT DOCUMENTS

| | | |
|---|---|---|
| DE | 1151723 B | 7/1963 |
| EP | 0559486 B1 | 1/1997 |
| EP | 1338201 A1 | 8/2003 |
| EP | 1597974 B1 | 11/2008 |
| EP | 1759585 B1 | 3/2011 |
| JP | S50135795 U | 11/1975 |
| JP | S588061 Y2 | 2/1983 |
| JP | H08156902 A | 6/1996 |
| JP | H09098759 A | 4/1997 |
| WO | 2009031212 A1 | 3/2009 |
| WO | 2009127380 A2 | 10/2009 |

\* cited by examiner

FILLING FLOW DIVIDER

CROSS REFERENCE TO RELATED APPLICATION

The present application claims priority to European Patent Application No. 22159170.4 filed on Feb. 28, 2022. The entire contents of the above-listed application are hereby incorporated by reference for all purposes.

TECHNICAL FIELD

The invention relates to a filling flow divider for food products as well as to a filling machine with such a filling flow divider and to a method.

BACKGROUND

Food products, in particular pasty masses, are filled in a known manner into individual containers. The mass to be filled is conveyed, e.g. via a filling machine, to a filling flow divider which divides the incoming mass flow into several partial mass flows and can discharge them portion-wise into the container via a corresponding outlet. In order to set an exact volume flow, the filling flow divider has dosing devices, e.g. paddle wheels, which are driven together via a common drive or are driven in freewheeling mode via the partial mass flow.

SUMMARY

During production, it may happen that in a multi-lane system not all containers are always available for filling at the filling position. For example, in an eight-lane production line, only seven containers out of eight are available.

If the product to be filled is discharged at the empty position, the production line will be contaminated. For this reason, production must then be stopped so that the product to be filled is not discharged at the empty production position. Thus, the available containers continue to run unfilled. These unfilled containers must then later be ejected from the further production process.

This applies not only to containers, but also applies to dosing directly onto or into a food product. In contrast to the containers, the food products that have not yet been dosed must be disposed of. An example of this is the filling of a doughnut, which could not take place, or the dosing of a sauce onto a fish, with the can subsequently being sealed, etc., the application of a food product onto a pastry, etc. This is uneconomical and unsustainable.

Alternatively, the dosing devices could also be controlled separately, i.e. each dosing device has an individual drive which can be controlled and switched off individually. However, a device that then has, for example, eight separate pumps is complex in several respects: The costs here are considerably higher than for coupled dosing devices.

Handling as well as cleaning eight separate pumps is also more difficult.

Based on this, the problem underlying the present invention is to provide a filling flow divider, a filling machine, as well as a method which can prevent unintentional ejection of mass from the outlet of a partial line without stopping the dosing process or even the entire production process in the production line.

According to the invention, the problem is solved by the features as described herein According to the present invention, the filling flow divider for food products comprises an inlet via which an incoming mass flow, e.g. from the filling machine, can be divided into several partial mass flows. The filling flow divider is configured such that it has several partial lines in which the partial mass flows can be transported further. Via the respective outlet of the partial lines, the partial mass flow can be ejected in particular portion-wise onto or into an object. The filling flow divider has several commonly driven dosing devices for setting the volume flow of the respective partial mass flows.

According to the invention, a valve device is arranged in each of the respective partial lines, which can divert the partial mass flow such that no mass is ejected via the outlet of the respective partial line.

By arranging a valve device in each of the respective partial lines, the partial mass flow can be diverted through the respective valve line such that no mass is ejected via the outlet of the respective partial line. This means that the partial mass flow can be diverted specifically in a particular partial line below the outlet of which there is a problem, for example no object is available at the filling position. All other partial lines can discharge mass via their outlet so that production does not have to be interrupted. Thus, all existing containers/food products can be filled optimally. This means that the partial mass flow in each partial line can be diverted individually, independently of the mass flows in the other partial lines.

In the absence of objects to be filled or occupied, there is no unwanted contamination. In addition, unfilled containers or food products do not have to be ejected and disposed of. Furthermore, there is the possibility that the diverted partial mass flow can be reused.

In this context, portion-wise means that a certain amount (e.g. with pre-determined weight and/or volume) of mass is ejected onto or into an object and a corresponding portion is ejected into or onto respective subsequent objects.

In this process, the mass can be transported intermittently, e.g. by a conveyor of a filling machine, such that certain portion sizes result (a certain volume per portion can be set on the filling machine, for example), or the mass can be transported continuously and the objects moved through, e.g. below the partial mass flows.

This means that continuous operation of the conveyor is also possible, e.g. when mass is discharged continuously, e.g. in several lanes, onto an object, e.g. a dough lane. If the object, e.g. the dough lane, is not wide enough for some reason or breaks off when viewed in the transport direction, this can be detected and e.g. the respective valve device can close the outer outlets.

According to one embodiment, for example, at the transition from one object (e.g. container to be filled) to the respective subsequent object, the partial mass flow can be diverted via the respective valve device such that no mass is discharged between the objects. This is particularly preferred if the mass is transported continuously.

When this application refers to filling or filling position, it equally includes the application of mass, or the application or discharge position.

The solution according to the invention is easy and inexpensive to implement.

Advantageously, the filling flow divider also comprises a control device. The control device can be a separate control device of the filling flow divider, but can also advantageously be part of a control system of a filling machine that can convey the mass flow to the filling flow divider.

Furthermore, the filling flow divider preferably has a sensor device which can detect whether a corresponding object is available for the respective partial lines and can transmit a corresponding signal to the control device.

Once the sensor device detects that no object is available for a partial line, the control device controls the valve device of this partial line such that the partial mass flow is diverted.

This always ensures that the mass is not discharged unintentionally and, for example, contaminates a conveyor belt or a base. This means that it can be detected immediately if no object is available in the respective filling position below the outlet of the respective partial line or it can be determined in advance that no object will be available at a certain filling time. If there is another object on a transport lane behind the empty position in the direction of transport of the objects, a portion can be discharged again at this filling position if this object is in the filling position.

In this context, the valve device can be configured such that the respective partial mass flow is diverted into a branching diversion line. The partial mass flow can then be diverted via a corresponding diversion line and, if necessary, reused. However, it is also possible for the partial mass flow to be diverted from the partial line into a collecting device, without an additional diversion line. However, a diversion line helps to discharge the mass in a more defined manner.

Advantageously, the diversion line leads the diverted mass into a collecting device. The mass in the collecting device can then, for example, be fed back to the hopper of a filling machine to be processed again. This means that food products do not have to be disposed of.

According to a preferred embodiment, the valve device comprises a diversion valve, in particular a multi-way valve, e.g. a two-way or three-way valve. Thus, for example, in a first position, the partial mass flow can be discharged via the outlet and in a second position, the partial mass flow can be directed into a diversion line. A corresponding configuration is easy and inexpensive to implement.

According to another embodiment, a valve device can have a shut-off valve in the partial line and a valve connected upstream in the direction of flow, in particular a pressure relief valve, to divert the partial mass flow. If, for example, the shut-off valve is closed in the partial line, the pressure in the partial line increases. At a predetermined pressure, the pressure relief valve in the partial line opens and the partial mass flow is diverted.

According to a preferred embodiment, the diverted mass can be fed back to the mass flow upstream of or in the filling flow divider, in particular via the diversion line. The diversion line can then be connected to a hopper of a filling machine, for example. In this case, an additional pump may be required to pump the diverted mass flow on to a filling hopper.

According to the present invention, it is thus possible for the dosing devices to be driven by a common motor or for the dosing devices to be driven by the partial mass flows, in particular in the form of paddle wheels rotating freely about an axis. The present invention makes it possible to have only one drive, i.e. either a motor or the mass flow and a common axis of rotation, and still ensure that the partial mass flows can be diverted individually.

The invention also relates to a filling machine for discharging a mass of foodstuff portion-wise with a filling flow divider.

The filling machine and the filling flow divider are particularly suitable for conveying pasty masses, such as sausage meat, dough, jam, creams, nut masses, etc., or also chunky food products, such as meat salad. The mass can also be a liquid, such as soup, with or without chunky ingredients.

The filling machine is, for example, a filling machine used for sausage production. The filling machine has a filling hopper for receiving a food mass, and a conveyor, for example a vane pump or a screw pump, for conveying the pasty food mass to the filling flow divider.

The filling machine can have several parallel transport devices, in particular transport belts, via which the objects can be brought into the filling position one after the other in several lanes, i.e. transported below the outlet of the corresponding partial lines.

The filling machine preferably has a control system which is connected to the sensor device and controls the valve devices as a function of a sensor signal. It is particularly preferred if the control device of the filling machine also controls the filling flow divider and the sensor device. The sensor device can be, for example, an optical sensor, such as color sensors, laser reflective scanners, or even a camera system that can be used to monitor the entire filling area. Metallic objects can also be detected with inductive sensors. Capacitive sensors or ultrasonic sensors are also suitable for detecting the objects. The sensor device comprises e.g. several sensor elements, i.e. one sensor element each for a corresponding path.

It is particularly preferred if the sensor device is arranged upstream of the filling position, viewed in the transport direction of the objects. The control device can then send a signal to the valve device in good time to ensure that no food product is discharged at the time of filling of the missing object, i.e. at the time when the missing object would actually have arrived at the filling position.

Additionally or alternatively, the control device can also control the conveying devices as a function of a sensor signal. In the event that all objects are missing at the filling position, the control system can, for example, control the conveying devices, e.g. transport belts, in such a way that the transport device is moved in the transport direction in which at least one object is available, so that the respective object is then transported to the filling position. It is also possible that the objects, e.g. containers, are conveyed in several rows on a common transport device, e.g. transport belt, and then when all objects are missing at the filling position, the transport device is moved until at least one container is arranged at the filling position.

The invention also relates to a method for discharging food mass, in particular portion-wise, with a filling machine, wherein the food mass is conveyed from the filling hopper via the conveyor to the filling flow divider, in which the incoming mass flow is divided into several partial mass flows. The mass is transported further in several partial lines and discharged portion-wise onto or into an object via the outlet of the partial lines. The volume flow of the respective partial mass flows is adjusted via several jointly driven dosing devices. A valve device is arranged in each of the respective partial lines which, in response to a signal from the control device of the filling machine, can divert the partial mass flow for each partial line individually, such that no mass is discharged via the outlet of the respective partial line.

It is preferred if the control device sends a signal to the valve device to divert a partial mass flow when a sensor device detects that no object is available for a partial line. This partial mass flow is then diverted by the valve device. In this process, the sensor device does not necessarily have to detect the presence of an object at the filling position, but can also detect a detection in the production stream at a position arranged upstream in the transport direction, wherein a control device can then determine in advance that no object is available for a specific position at a specific point in time.

According to a preferred embodiment, the signal for diverting the partial mass flow is sent before a portion should have been discharged from the partial line into the object at a discharge time. The valve devices of the partial lines for which it has been detected by the sensor device that an object is available at the discharge time, the respective partial mass flow is not diverted.

The present invention thus enables the partial mass flow to be selectively stopped.

BRIEF DESCRIPTION OF THE FIGURES

The present invention is explained in more detail below with reference to the following figures.

DETAILED DESCRIPTION

Figure 1:
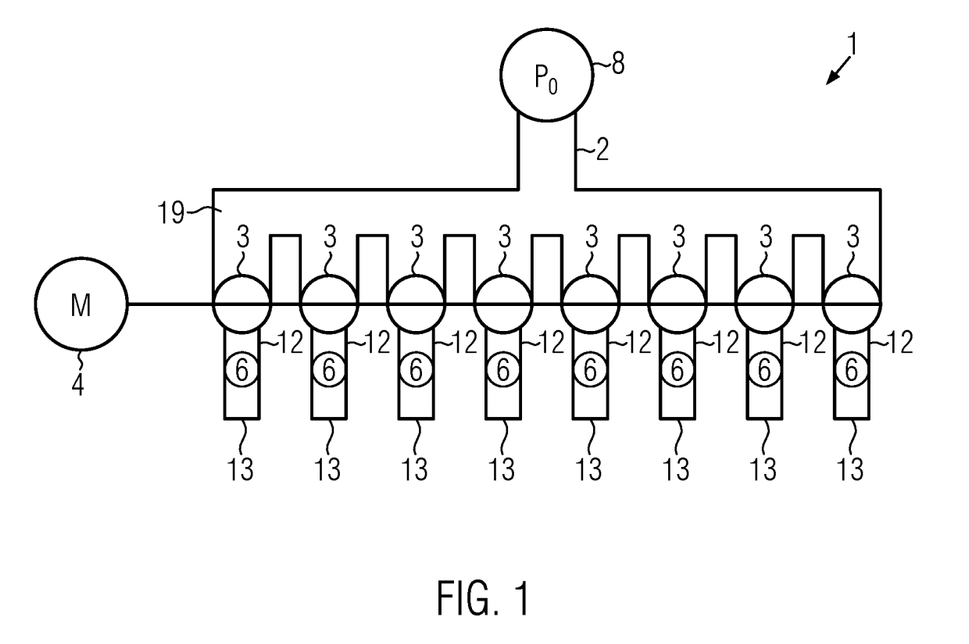
FIG. 1 shows a rough schematic of a filling flow divider according to the present invention.
Figure 2:
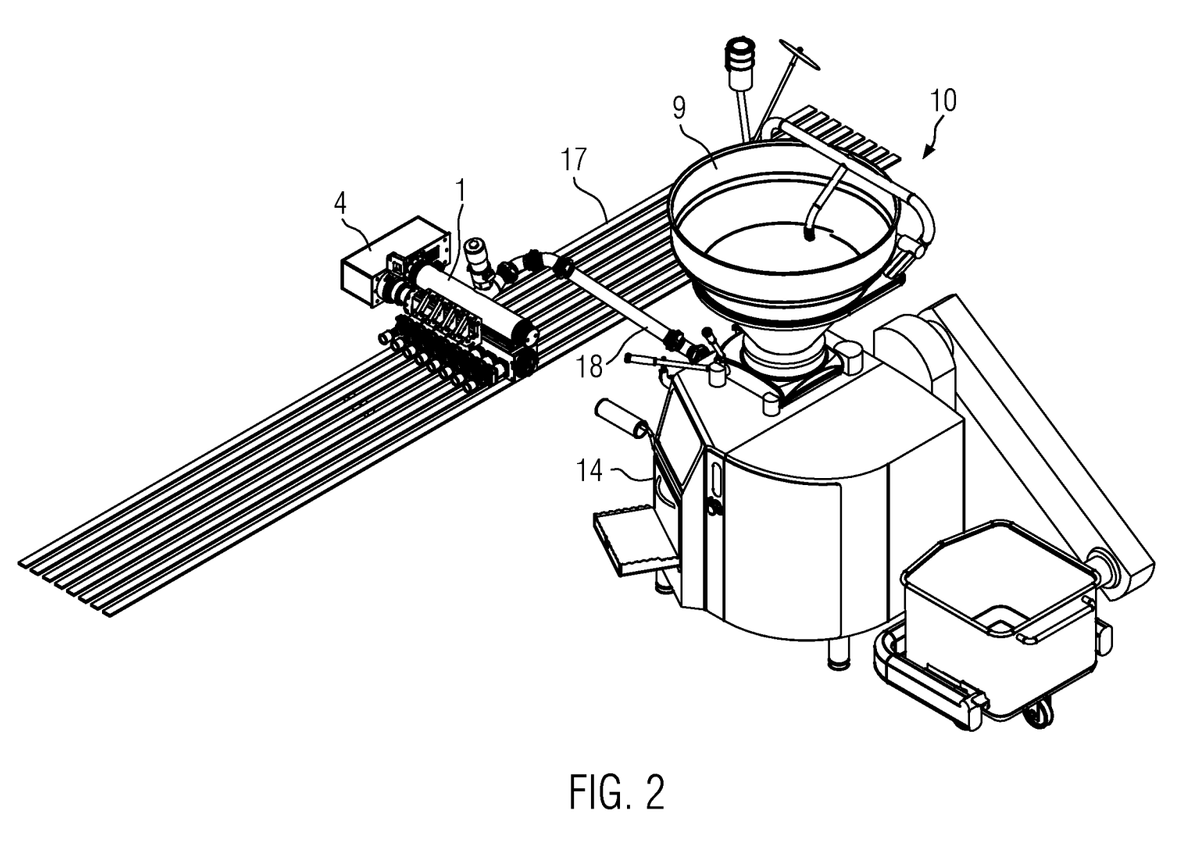
FIG. 2 shows a perspective view of a filling machine with a filling flow divider according to the present invention.

FIG. 1 shows a rough schematic of a filling flow divider 1 according to the present invention, and FIG. 2 shows a perspective view of a filling machine with a filling flow divider.

FIG. 2 shows the filling machine 10 with a hopper 9 for receiving the mass, in particular a pasty mass. The food product can be either a pasty mass, such as sausage meat, dough, jam, creams, nut mass, etc., or a chunky one, such as meat salad. The mass can also be a liquid, such as soup, with or without chunky ingredients. The filling machine 10 is for example a vacuum filler. The filling machine comprises a conveyor 8 which can convey the mass into a line, here in particular pipe 18, and from the line 18 to the filling flow divider 1. The conveyor may be, for example, a vane pump or a screw pump, etc. Viewed in the direction of flow, the filling flow divider 1 is arranged downstream of the line 18.

The filling flow divider 1 divides the mass flow conveyed by the conveyor 8 into several partial mass flows, as shown in FIG. 1, e.g. into eight partial flows. The mass flow reaches the filling flow divider 1 via an inlet 2 and flows into a collection chamber 19. Then the common chamber 19 branches into several partial lines 12—in FIG. 1 and FIG. 2 into eight partial lines. In order to keep the volume flow in the individual partial lines 12 constant due to the pressure drop, dosing devices 3 are provided in the corresponding partial lines 12.

In FIG. 1, the dosing devices 3 are shown schematically in the partial lines. However, the dosing devices 3 can also be arranged at the beginning of the lines 12. In the embodiment shown in FIG. 1, the dosing devices are driven by a common drive, in particular the common motor 4, and are coupled such that, for example, there is an identical volume flow in each line downstream of the respective dosing device.

However, it is also possible for the dosing devices 3 to be driven by the product, i.e. by the partial mass flows, and to be configured, for example, as paddle wheels which rotate freely about an axis and are coupled to one another, i.e. in particular rotate about a common axis. The partial lines 12 can be pipes or at least partially in the form of hoses, or have nozzles at the discharge end not shown here. The partial mass flow can then be discharged via the outlet 13, in particular portion-wise onto or into the respective objects. The objects 7 can be containers to be filled, such as jars or cans into which, for example, jam is filled. However, they can also be food products to which (or into which) mass is applied, such as sauce or spice paste on a fish or, for example, chocolate mass on a dough piece. It can also be already cooked pastry pieces, such as doughnuts, into which jam is injected (portioned).

The objects 7 are conveyed, e.g. as shown in FIG. 2, via respective transport devices 17 (in FIG. 2, for example, eight conveyor belts) below the outlet 13 of the filling flow divider to a filling position P in order to fill the objects 7 or to apply the mass to the objects. The transport devices can also be controlled by the filling machine control system, or the control system for the transport devices is connected to the filling machine control system.

The filling flow divider can also preferably have a sensor device 5 which can detect whether a corresponding object 7 is available for the respective partial lines 12 at the filling position P at the time of filling.

In FIG. 2, a corresponding sensor device 5 is shown only schematically. A corresponding sensor device can comprise several sensors, in particular optical sensors, which can detect the availability of the objects 7 on the corresponding transport devices.

Figure 3:
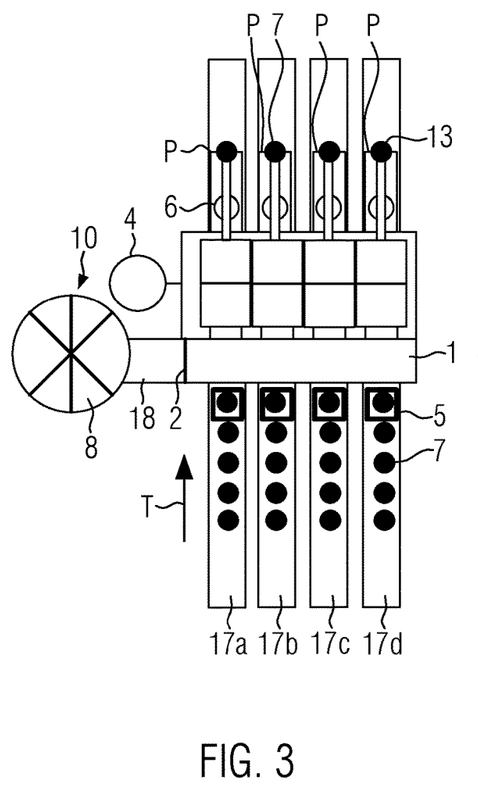
FIG. 3 shows a schematic top view of a filling machine with a filling flow divider according to the present invention, in which all objects are available.
Figure 4:
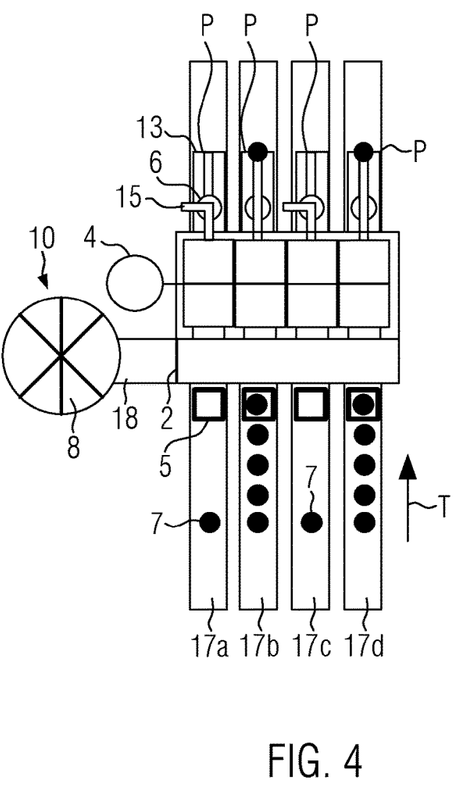
FIG. 4 corresponds to the filling machine according to the present invention shown in FIG. 3 with missing objects.

FIGS. 3 and 4 show filling machines 10 with filling flow dividers 1 according to the invention in greater detail. FIGS. 3 and 4 show filling flow dividers with four partial lines and four transport devices 17 a, b, c, d for the sake of simplicity. The number of partial lines is preferably in a range from 2 to 24. A corresponding number of transport devices 17 can then be provided. FIG. 3 clearly shows the conveyor 8 of the filling machine 10 and the filling flow divider 1 connected via a line 18 and the commonly driven dosing devices 3. In FIG. 3, the objects 7, e.g. containers to be filled, are evenly distributed on the transport devices 17 a, b, c, d. The filling flow divider 1 and the dosing devices 3 are arranged in the same way. There are no empty positions.

Via the sensor device 5, it can be detected whether objects 7 are available on the respective transport devices 17 a, b, c, d. For this purpose, the sensor device 5, or its respective individual sensors, is connected to a control device 14 not shown, which receives the corresponding signal. Preferably, this control device 14 is integrated in the control 14 of the filling machine (see FIG. 2). Here, the sensor device has several sensors in an area viewed in transport direction T in front of the outlet 13 of the respective partial lines, i.e. in front of the outlet position P on the respective transport devices. In FIG. 3, the sensor device 5 has detected that there are no empty positions and that all objects 7 are correctly available, so that the production process can take place normally, i.e., corresponding portions of mass can be discharged via the outlet 13 of the respective partial lines into the individual objects 7 at the portion positions P.

According to the present invention, as also shown in FIG. 1, the filling flow divider in the respective partial lines 12 comprises a valve device which can divert the partial mass flow in the respective partial line 12 such that no mass is discharged via the outlet 13 of the respective partial line, in particular when empty positions are detected.

The respective valve device 6 can be controlled via the control device 14. Preferably, the valve device 6 is controlled when it is detected by the sensor device 5 that no object 7 is available for a particular partial line. Then, the partial mass flow can be diverted. FIG. 4 shows that there are malfunctions in the transport devices 17a and 17c, i.e. that objects 7 which should actually be filled are missing here. These empty positions can be detected by the sensor device 5, i.e., the respective individual sensors 5. The control device 14 then controls the valve device 6 in the respective partial line so that the partial mass flow is diverted if the unavailable object 7 should be filled. The objects 7 that are conveyed on the other transport devices 17b and 17d can continue to be filled regularly.

If the sensor device detects that an object 7 is missing, the mass flow can either be diverted immediately or, if the respective sensor is arranged upstream of the filling position in the transport direction, with a time delay, so that available containers that are ahead can still be filled. Namely, the control system can determine, based on the parameters known to it, such as speed of the transport devices 17 a, b, c, d, etc., at what time a mass will be filled into or onto the object 7, i.e., when the missing object would be in the filling position.

As soon as the sensor device detects that, for example, an object is again located on the transport device 17c, for example the object 7x on the transport belt 17c, it sends a corresponding signal to the control device 14, such that when this object is located in the filling position P, the valve device 6 is controlled such that product can be filled into the object via the outlet 13. A new object 7y is only located one filling cycle later on the transport device 17a than the object 7x on the transport device 17c. This means that if the sensor device 5 also detects the object 7y here, the valve device 6 is controlled by the control device 14 such that mass is again filled from the outlet 13 into or onto the container 7y in the corresponding subsequent filling cycle.

In the preceding embodiments, the sensor device is located upstream of the filling flow divider 1, and the control device calculates when a corresponding container 7 is in the filling position P. However, it is also possible that the sensor device 5 is arranged directly in the area of the filling positions P. However, if the respective sensors of the sensor device are arranged upstream of the filling position P as viewed in transport direction T, a signal can be sent anticipatorily to the valve devices 6 in good time so that the product flow can be diverted from the respective partial line 12 in good time.

Figure 5A:
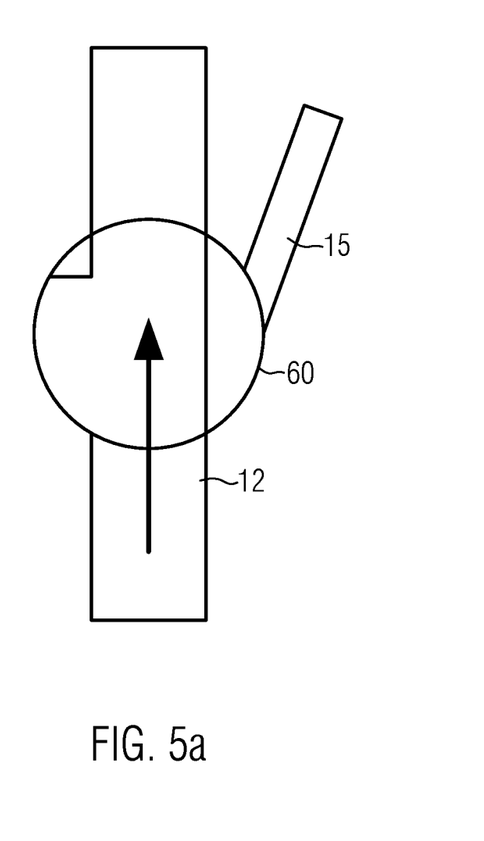
FIG. 5a shows a rough schematic of a valve device according to the present invention in a first switching state.
Figure 5B:
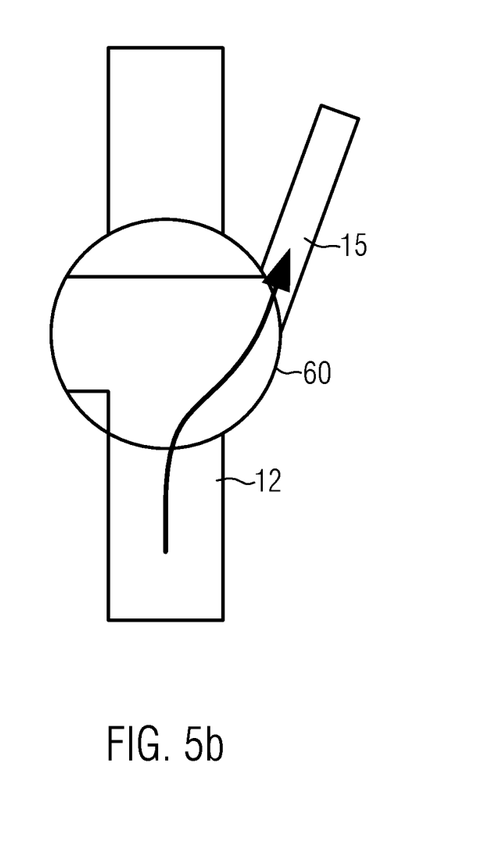
FIG. 5b shows the valve device shown in FIG. 5a in a second switching state.
Figure 6:
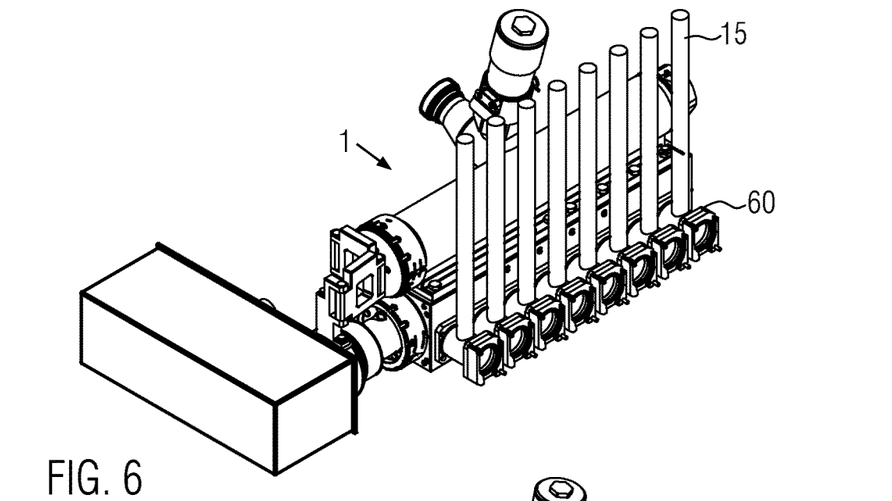
FIG. 6 shows a perspective view of a filling flow divider with a valve device and a diversion line.
Figure 8:
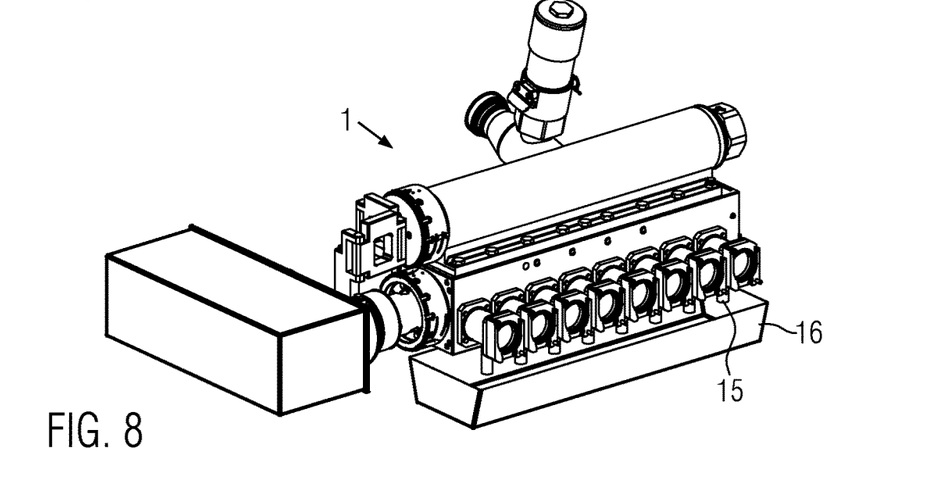
FIG. 8 shows a perspective view of a filling flow divider with valve device and collecting device.

FIGS. 5a and 5b show an example of a corresponding valve device. In FIG. 5a, the valve device comprises a two-way valve. Here, the valve 60 is in a position that the filling flow can flow through the partial line 12 to the outlet 13. FIG. 5b shows the two-way valve in a second position, wherein here, the partial flow from the partial line 12 is not directed to the outlet 13, but into a diversion line 15. A two-way valve is only one example, here. A three-way or multi-way valve can also be used, for example, and discharge mass into different lines. FIG. 6 shows a corresponding arrangement in the filling flow divider. The product can then be returned via line 15, for example to the hopper 9 of the filling machine 10. Alternatively, the respective partial product flow can be directed via a corresponding two-way valve into a collecting device 16, e.g. a trough, see FIG. 8. This trough can then be returned to the process after a certain time, e.g. emptied into the hopper 9 of the filling machine 10.

Figure 7:
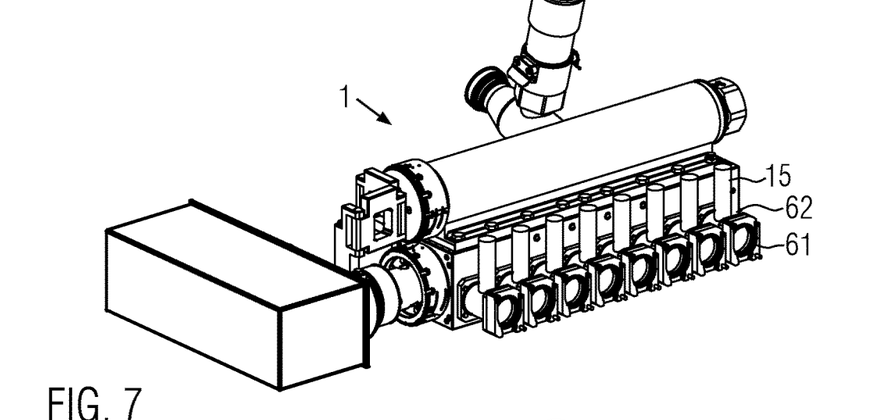
FIG. 7 shows a perspective view of a filling flow divider according to the present invention with shut-off valve and pressure relief valve.

It is also possible that the valve device 16 comprises a shut-off valve 61 and a pressure relief valve 62, as shown in FIG. 7. If the valve 61 closes the partial line 12, the pressure in the partial line 12 increases and the overpressure valve 62 can open and the partial volume flow can be diverted via a corresponding diversion line 15.

According to the method according to the invention, food product mass is conveyed by a filling machine 10 from the filling hopper 9 via the conveyor 8 to the filling flow divider 1 and divided in the filling flow divider 1 into several partial mass flows, transported further in several partial lines 12 and discharged via their outlet 13 in a filling position P, in particular portion-wise onto or into the objects 7. The objects 7 are transported along several parallel lanes 17 one after the other. If it is detected that an object is missing, the sensor device sends a corresponding signal to the control device 14, which then controls the valve device 6 in the partial line 12 for which the missing object was detected such that at least the food portion intended for this missing object 7 is diverted via a diversion line 15. The remaining valve devices can remain switched such that food product is discharged into or onto the objects 7. If it is subsequently detected that an object 7 is again available on the lane with an empty position, the valve device 6 can be switched again such that, when the object is in the filling position P, mass is discharged via the outlet. The diverted partial mass flow can be returned to production as described above.

A feature of all embodiments is that the individual valve devices 6 in the respective partial lines 12 can be selectively and individually controlled so that, if necessary, the partial mass flow in a respective partial line can be diverted while other partial mass flows in the other partial lines can be discharged via the corresponding outlet 13. Thus, for example, in the absence of an object 7, the complete process does not have to be stopped.

FIGS. 2-4 and 6-8 are drawn to scale, although other relative dimensions may be used, if desired.

The invention claimed is:

1. Filling flow divider for food products with an inlet, via which an inflowing mass flow can be divided into several partial mass flows, transported further in several partial lines and discharged via their outlet with
    several commonly driven dosing devices for setting the volume flow of the respective partial mass flows,
    wherein a valve device is arranged in each of the respective partial lines, which can divert the partial mass flow individually and independently of the mass flows in the other partial lines such that no mass is discharged via the outlet of the respective partial line, and
    wherein the filling flow divider further comprises:
        a control device,
        a sensor device which is configured such that it can detect whether a corresponding object for filling is available for the respective partial lines and transmits a corresponding signal to the control device, wherein, if the sensor device detects that no object is available for a partial line, the control device controls the valve device of this partial line such that the partial mass flow is diverted.

2. Filling flow divider according to claim 1, wherein the valve device is configured such that the respective partial mass flow can be diverted into a diversion line or can be diverted from the partial line into a collecting device.

3. Filling flow divider according to claim 2, wherein the diversion line diverts the diverted mass into the collecting device.

4. Filling flow divider according to claim 1, wherein the valve device has a diversion valve.

5. Filling flow divider according to claim 1, wherein the valve device has a shut-off valve and a valve connected upstream as viewed in the direction of flow, in order to divert the partial mass flow.

6. Filling flow divider according to claim 1, wherein the dosing devices are driven by a common motor or the dosing elements are driven by the partial mass flows and are configured as paddle wheels rotating freely about an axis.

7. Filling machine for discharging a food mass portions-wise with the filling flow divider according to claim 1, wherein the filling machine comprises a filling hopper for receiving a pasty mass and a conveyor for conveying the pasty mass to the filling flow divider.

8. Filling machine according to claim 7, wherein the filling machine further comprises a plurality of parallel transport devices via which objects can be transported in a plurality of lanes, in each case into a filling position below the outlet of the corresponding partial lines.

9. Filling machine according to claim 7, wherein the filling machine has a control device which is connected to the sensor device and, as a function of a sensor signal, controls the valve device and/or the transport device or transport devices.

10. Filling machine according to claim 8, wherein the sensor device, viewed in a transport direction of the objects, is arranged upstream of the filling position.

11. Filling flow divider according to claim 1, wherein inflowing mass flow is divided into several partial mass flows, transported further in several partial lines and discharged via their outlet portion-wise, onto or into an object.

12. Filling flow divider according to claim 4, wherein the diversion valve is a multi-way valve.

13. Method for discharging food product mass with a filling machine according to claim 8, wherein the mass is conveyed from the filling hopper via the conveyor to the filling flow divider, in the filling flow divider, an inflowing mass flow is divided into several partial mass flows, transported further in several partial lines and discharged via the outlet thereof portion-wise, onto or into an object, wherein the volume flow of the respective partial mass flows is set via several commonly driven dosing devices, wherein a valve device is arranged in each of the respective partial lines and, in response to a signal from a control device of the filling machine, can divert the partial mass flow for each partial line individually, such that no mass is discharged via the outlet of the respective partial line.

14. Method according to claim 13, wherein the control device sends a signal to the valve device for diverting a partial mass flow when a sensor device detects that no object is available for a partial line and this partial mass flow is diverted by the valve device.

15. Method according to claim 14, wherein the signal for diverting the partial mass flow is transmitted before a portion should have been discharged from the partial line at a discharge time into the missing object, while the valve devices of the other partial lines for which it was detected by the sensor device that an object is available do not divert the respective partial mass flow.

* * * * *